UNITED STATES PATENT OFFICE.

ADAM I. KLOCK, OF ST. JOHNSVILLE, NEW YORK.

METHOD OF MANUFACTURING MIRRORS.

SPECIFICATION forming part of Letters Patent No. 526,398, dated September 25, 1894.

Application filed November 13, 1893. Serial No. 490,820. (Specimens.)

*To all whom it may concern:*

Be it known that I, ADAM I. KLOCK, a citizen of the United States, residing at St. Johnsville, in the county of Montgomery and State of New York, have invented certain new and useful Improvements in Methods of Manufacturing Mirrors, of which the following is a specification.

My invention relates to mirrors, and consists in a novel method of making the same as hereinafter set forth and claimed.

Heretofore, in the construction of mirrors it has been customary to apply to the glass a layer of tin-foil, and, subsequently to apply to the foil a layer of mercury,—the mercury uniting with the foil to form the backing for the glass. This is a delicate process, requiring considerable time, and resulting in the production of a mirror whose backing is easily defaced even by water or sun-light.

The present invention is designed to overcome these objections, and consists, briefly, in applying to the glass an amalgam previously fused or melted, which immediately hardens or sets upon application.

In carrying out my invention I take, preferably, two parts (by weight) of tin, two of lead, and one of mercury, and subject them to a heat (from 200° to 640° Fahrenheit) sufficient to reduce them to the liquid state. The amalgam so made may be set aside for future use, or used immediately, as preferred; but where it is allowed to cool, it will have to be re-melted before being applied to the glass.

The liquid or fluid amalgam is placed within a suitable spreading device which is designed to evenly distribute the fluid amalgam over the surface of the glass. By preference, I prefer to arrange the crucible in which the amalgam is fused, with an opening in the bottom, through which the fused amalgam passes into a spreading device or trough which latter is also heated to prevent the amalgam from becoming chilled. The sheet of glass is placed upon suitable traveling supports, preferably rollers, and is carried beneath the trough or spreader from which it receives a layer or coating of the amalgam, the travel of the glass being properly timed with respect to the discharge of the amalgam from the spreader. The amalgam descends from the spreader in a thin even stream and, immediately upon striking the cooler glass, hardens or sets and forms a coating unaffected by water or sun-light, and one that is tough and not easily scratched.

It is to be distinctly understood that the present invention is not restricted to the use of the amalgam of tin, lead, and mercury, before mentioned, as various other amalgams may be used, as for instance, an amalgam of tin, bismuth and silver.

When the first-mentioned amalgam is employed, the tin and lead should be first melted, and the mercury subsequently added to avoid loss of the latter by vaporization.

Having thus described my invention, what I claim is—

The method of manufacturing mirrors, which consists in fusing an amalgam of lead, tin, and mercury, and applying the amalgam while heated, to a plate of glass.

In witness whereof I hereunto set my hand in the presence of two witnesses.

ADAM I. KLOCK.

Witnesses:
 H. H. HEALY,
 J. R. KYSER.